Feb. 8, 1966  R. S. ROGERS  3,234,532
ALARM MEMORY CIRCUIT
Filed March 13, 1962
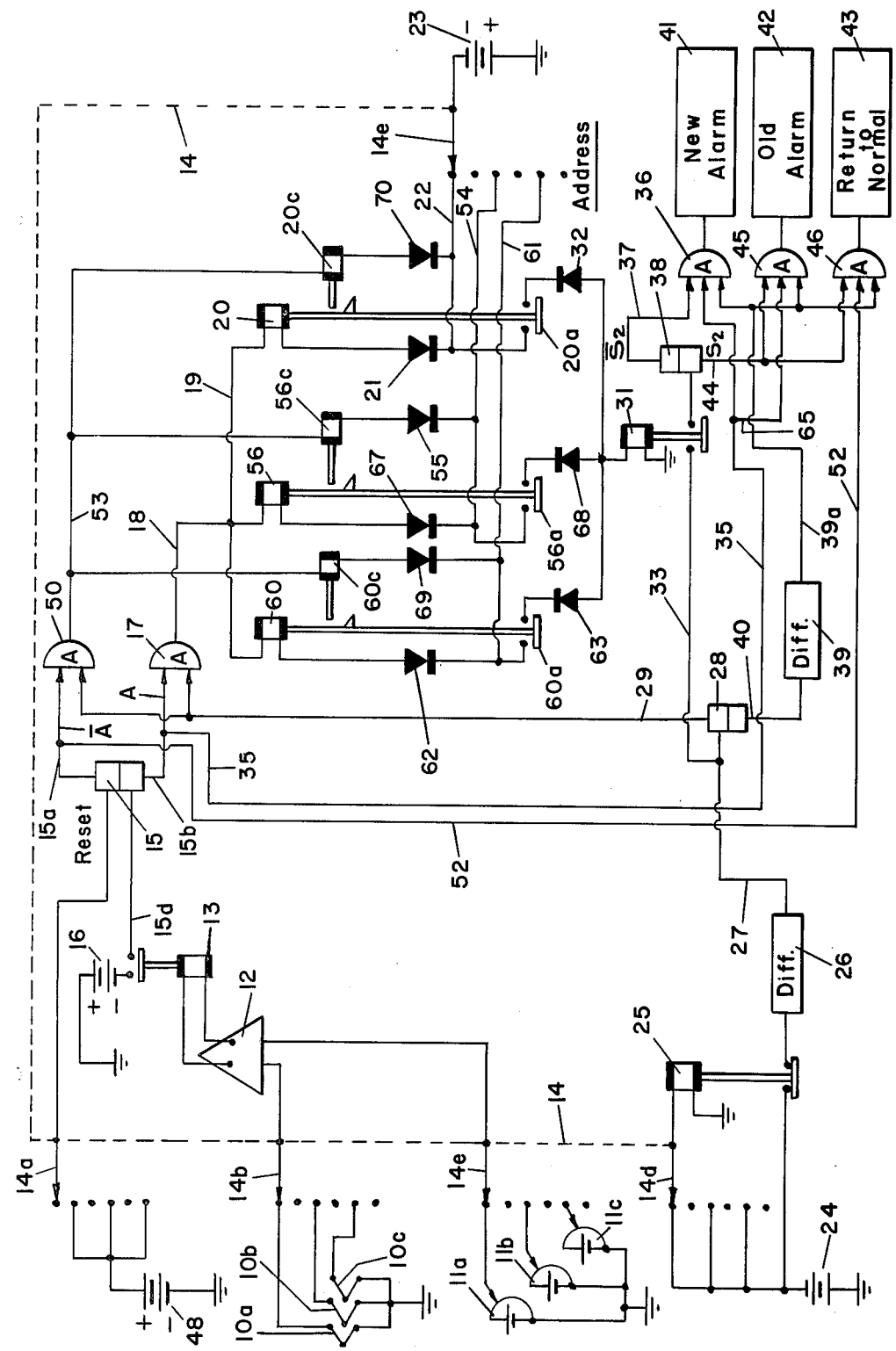

3,234,532
ALARM MEMORY CIRCUIT
Richard S. Rogers, Norristown, Pa., assignor to Leeds and Northrup Company, Philadelphia, Pa., a corporation of Pennsylvania
Filed Mar. 13, 1962, Ser. No. 179,354
9 Claims. (Cl. 340—213)

This invention relates to systems of measuring and controlling magnitudes of conditions and has for an object the provision of means for scanning the magnitudes of a plurality of conditions and during each scan, signaling when a change occurs above or below a predetermined set value, together with an indication of the fact that the aforesaid change has occurred.

As new techniques have become available, single output circuits for measuring and control systems can be utilized for the multiplicity of variables or magnitudes of conditions associated with a complex process or instrumentality, whereas in the past there have been definite limits, because of the time required, as to the number of conditions a single circuit could accommodate. Thus, with the high speed operation of computers and corresponding high speed coders and encolers for transformation of analog values to binary numbers, the magnitudes of hundreds of conditions per second may be measured and recorded. With such high speed operations, it nevertheless becomes necessary to determine changes in magnitudes and to signal the fact that the change is of such extent as to exceed a predetermined safe value. If it has, an alarm signal is produced. This information is stored in a memory so long as the magnitude exceeds the selected safe value and another signal is produced indicative of this relation, and when the value under control has been returned to a safe value, a still further signal indicates that fact.

In carrying out the present invention, there is utilized a memory system comprising a plurality of bistable relays, each relay having the characteristic of remaining in the position to which last operated. These bistable relays are controlled by a series of AND circuits which in association with bistable flip-flop circuits produce the desired output signals which may be designated "New Alarm," "Old Alarm" and "Return to Normal." In association with an addressing means, information may be obtained at any time as to the several conditions which have exceeded their safe values, and the system will automatically indicate return of any magnitude of a condition from an unsafe to a safe value and any change from a safe to an unsafe value. Though in the drawings and following description relay means of the latched-in type have been illustrated, it will be understood that relays of any bistable type having a set means and a reset means may be substituted therefor, since all of the functions may be performed by them as will hereinafter be described.

For a more detailed discussion of a system embodying the invention, reference is to be had to the following description taken in conjunction with the accompanying drawing diagrammatically illustrating one embodiment of the invention.

Referring to the drawing, thermocouples 10a–10c may be taken as representative of condition-responsive means which may be of any of the various kinds well known to those skilled in the art for measuring temperature, pressure, rates of flow, and chemical composition including pH. Associated with the several thermocouples 10a–10c are limit-determining means shown as self-powered potentiometers 11a–11c. Each potentiometer, besides its battery, includes a slidewire and means for relatively adjusting the slidewire and its associated contact to obtain from the potentiometer a voltage representative of a safe limit value for the magnitude of a condition comprising the measured variable. Thus for a thermocouple, the safe limit value may either be a selected high temperature or a selected low temperature. As shown, the temperature to which the thermocouple 10a is subjected has a predetermined safe limiting value as provided by the setting of potentiometer 11a. Thus, the temperature to which thermocouple 10a is subjected produces a voltage output from that thermocouple which is opposed by the voltage derived from potentiometer 11a, and the difference is applied to and amplifier 12.

If the voltage output of thermocouple 10a exceeds that from potentiometer 11a, the amplifier 12 energizes a relay 13 to complete a circuit from a battery 16, having one side connected to ground, and its opposite negative side connected to the input of a bistable flip-flop circuit 15. Accordingly, this flip-flop circuit changes from its initial state to its second state for a negative output at output conductor 15b which is applied to one of the inputs of an AND circuit 17. The other input to the AND circuit 17 is enabled or has applied to it a negative input signal in manner which will now be explained.

It will be seen that the contact 14b is but one of several contacts of a multipoint switch 14. Another of its contacts 14d is illustrated as completing a connection from a battery 24, having one side connected to ground, to an operating coil of a relay 25. This relay, shown in its energized position, completes a circuit from battery 24 to apply a voltage to a differentiating circuit 26 of conventional form, and thus the output from differentiating circuit 26 is a pulse developed when the contacts of relay 25 close. This pulse is applied to a single-shot multivibrator 28 by way of conductor 27. Thus, this multivibrator 28 produces a negative output pulse on its output conductor 29 which is applied to the lower one of the two inputs of AND gate 17. The pulse output from multivibrator 28 is designed to be sufficient length to permit operation of the appropriate relays 20, 56 and 60.

The AND circuit 17, being enabled, develops at its output conductor 18 a pulse which is applied by way of conductor 19 to the operating coils of relays 20, 56 and 60. Because the contact 14e is in its first position, only relay 20 is energized through a circuit including the diode 21, the contact 14e of the selector switch 14, and thence by way of battery 23 to ground. The voltage and polarity of the battery 23 is selected so that it requires the algebraic sum of its voltage and the voltage of the pulse from AND gate 17 to produce energization of relay 20.

In practice, the output of the AND gate 17 when it has not been enabled may be a negative voltage of, say, —10 volts, with the battery 23 also having a value of 10 volts and a polarity as indicated. This means that zero voltage difference will be applied to the operating coil of relay 20 until the AND gate has negative inputs applied thereto, at which time the conductor 18 will be raised to ground, thus making available the voltage of battery 23 for operating the relay 20. The relay 20 is thereupon energized to close its contacts 20a.

As shown, relay 20 is of the latched-in type and thus is retained in its energized position after its operating coil has been deenergized. Relays other than the latched-in type may be utilized for practising the present invention. The only requirement is that a relay of the bistable type shall be utilized, one which occupies one position or stage upon energization of one coil and remains in that position until such time as there is energization of a second relay coil, such as 20c. The relay shall then be operated to its other position or state and remains in that state until subsequent energization of the first coil.

The circuit to the operating coil of a relay 31, completed by way of contacts 20a and a diode 32, will later be described, since at the present time it serves no useful purpose and for the reason that the pulse at conductor 27 which is also applied to conductor 33 has terminated prior to closure of contacts 20a.

It is to be remembered that the temperature of thermocouple 10a was assumed to be beyond a safe limit and as a result, a negative output appeared at conductor 15b of the bistable flip-flop circuit 15. This negative output is applied by way of a conductor 35 to an AND circuit 36 having two additional inputs. The upper input circuit is connected to a conductor 37 leading to a single-shot multivibrator and which normally applies to conductor 37 a negative output and designated on the diagram as $\bar{S}_2$. The lower or third input of AND circuit 36 has a negative input pulse applied thereto by way of a conductor 39a connected to a differentiating circuit 39 and thence to an output conductor 40 of the single-shot multivibrator 28. The differentiating circuit 39 is arranged to produce a negative pulse on line 39a when the single-shot multivibrator 28 returns to its stable state, i.e., at the time of occurence of the trailing edge of the pulse applied to line 29. Accordingly, as soon as the bistable device 15 produced its negative output at conductor 15b and there was produced by the single-shot multivibrator 28 and differentiator 39 an output on conductor 39a, the AND gate 36 is enabled to energize a "New Alarm" signaling device 41 of any suitable kind, such as a signal lamp or a signal lamp in conjunction with or in place of an audible signaling arrangement.

In brief, the existence of a negative output on conductor 37 is indicative of the fact that an alarm condition had not existed previously. Thus the appearance of a negative signal on conductor 15b indicative of an existing alarm state must result from a new alarm condition, and the device 41 is operated when a strobe pulse appears on line 39a.

At the time the "New Alarm" signaling means is energized, the relay 20 has been operated to its latched-in position, a position which may be taken to record in the relay memory arrangement the fact that the thermocouple 10a has responded to a magnitude of a condition beyond its safe value.

The lack of a negative signal at $S_2$ and conductor 44 from the multivibrator 38 because there was no previous alarm condition shows at once that neither of AND circuits 45 and 46 may be enabled, and hence neither the "Old Alarm" device 42 nor the "Return to Normal" signaling device 43 can be energized.

The stepping switch 14 may now be operated to its second position. Circuits previously completed by contacts 14b, 14c, 14d and 14e are disconnected. The contact 14a in the second position completes a circuit from a source of supply, such as battery 48, to the bistable flip-flop circuit 15 to reset the flip-flop 15 to return the conductor 15b to ground and to apply a negative output signal to conductor 15a, and thence to an AND circuit 50 and by way of a conductor 52 to AND gate 46. Since there is an absence of the needed enabling pulses at AND gates 46 and 50, no additional operations take place.

The stepping or scanning switch 14 may now be advanced to its third position to disconnect the circuit at 14a and to complete circuits through the remaining contacts. There will be applied to amplifier 12 the difference between the voltage developed by thermocouple 10b and its potentiometer 11b. It will be assumed that the magnitude of the condition is below its safe upper limit and, therefore, the relay 13 remains deenergized, and thus the state of flip-flop 15 will not be changed.

It will be remembered that bistable device 15 was operated to produce a negative output at conductor 15a, and thus AND gate 50 is partially enabled. Accordingly, as contact 14d is moved to its third position, the relay 25 is again energized to complete a circuit from battery 24 to the differentiating circuit 26 for producing from the single-shot multivibrator 28 a negative output on conductor 29 which thereupon enables AND gate 50 to bring conductor 53 to ground potential. This makes effective or applies the potential of battery 23, by way of conductor 54 and diode 55, to the tripping coil 56c of a relay 56. Since the relay 56 of the latched-in type is already in its open position, the energization of tripping coil 56c at this time performs no useful function.

Upon occurrence of the strobe pulse on line 39a, none of the AND gates 36, 45 and 46 may be enabled, and hence none of the signaling devices 41, 42 and 43 is energized.

In the fourth position of the switch 14, the operations are the same as for the second poistion and need not be again described.

In the fifth position, the output voltage of thermocouple 10c is compared with the voltage from the potentiometer 11c. It will be assumed that the magnitude of the condition for thermocouple 10c has exceeded its safe value, and hence the amplifier 12 will energize relay 13 and the bistable flip-flop circuit 15 will be returned to a state applying a negative output to conductor 15b and which returns conductor 15a to ground. At the same time, the relay 25 is energized to develop from the differentiating circuit 26 a pulse on conductor 27 to energize the multivibrator 28 for development of a negative pulse on conductor 29, thus enabling AND gate 17. The potential of conductor 18 rises to ground potential, which through conductor 19 produces energization of the operating coil of relay 60. This circuit is completed from battery 23, contact 14e in its fifth position, conductor 61, diode 62, the operating coil of relay 60, and thence to conductors 18 and 19 now at ground potential. Accordingly, the relay 60 is moved to its latched-in position, and the relay 31 is energized from battery 23 through a circuit which includes the contacts 60a, a diode 63, and the operating coil of relay 31. This relay closes, but nothing further happens since the pulse at conductor 33 has already disappeared.

In the same manner as for the first-described operation of the system, the appearance at conductor 15b of the negative output applies by way of conductor 35 a negative input to the AND gate 36 which with the negative output $\bar{S}_2$ on conductor 37 and a strobe pulse on line 39a causes AND gate 36 to produce an output for the "New Alarm" signaling device 41. Thus in the assumed operations, the "New Alarm" device 41 has been twice energized, first with the selector switch in its first position and secondly in its fifth position.

With selector switch 14 in its last position, only the circuit through contact 14a is completed. However, there are no new operations to be described and, accordingly, it may be assumed that the switch 14 has been returned to its initial position. In this connection, the switch 14 may be of the rotary scanning type well known to those skilled in the art and adapted for relatively high-speed operation. It will be of relatively high speed since in most applications of the present invention, there will be a multiplicity of condition-measuring elements, only three having been illustrated to simplify the drawing and description. The repeated and rapid scanning of the condition-responsive devices maintains at hand information as to the magnitudes of the conditions in terms of change from the last measured state. Accordingly, as the second scanning operation begins, it will be assumed that the temperature of thermocouple 10a will have decreased to a safe value, and hence the amplifier 12 will not energize the relay 13.

It will be remembered that in the last position of the scanning switch, the bistable device 15 had been operated for a negative output on conductor 15a, and thus the AND gate 50 will be partly enabled. It is to be remembered that relay 20 is in its latched-in position, and hence with its contacts 20a closed, the return of contact 14e to its illustrated position completes an energizing circuit for relay 31 which may be traced from the ground side of battery 23 through relay coil 31, diode 32, contacts 20a, and by way of conductor 22 and contact 14e to the other side of the battery 23. Thus with the contacts of relay 31 closed, a check pulse developed upon energization of relay 25 by a return of contact 14d to its illustrated position will be applied by way of conductor 33 to the multivibrator 38 for producing a negative output on conductor 44 and thence to the upper input of AND gate 46. The multivibrator 38 is designed so that it will, after being triggered by a pulse on line 33, remain in its unstable state for a length of time longer than that of multivibrator 28. Thus the negative output on line 44 will remain until after the occurrence of the strobe pulse on line 39a. It will be noted that the negative output at conductor 44 is also applied to AND gate 45.

These two AND gates 45 and 46 and their associated signaling means distinguish between the two conditions where the thermocouple 10a might still be exposed to an unsafe temperature and to the presently assumed condition that its temperature has returned to a safe value. The latter being the case, it will be seen that the AND gate 46 is enabled by reason of the negative pulse applied by the differentiator 39 and conductor 39a to its lower input and by reason of the negative output at conductor 15a applied to AND gate 46 by way of conductor 52. Thus the signaling device 43 will be energized, and it will be known that the magnitude of the condition to which thermocouple 10a responds has returned to a safe value.

At the time the multivibrator 28 was actuated by the check pulse from conductor 27, there was produced at conductor 29 a negative output which enabled AND gate 50 and, accordingly, the battery 23 was made effective by way of diode 70 to energize tripping coil 20c to trip relay 20 for a return of its contacts 20a to their illustrated open position.

In the second position of switch 14, no further operations take place, but in the third position it will be assumed that no change has taken place in the temperature of thermocouple 10b, and hence no alarm operations take place.

The same applies to the fourth position, but in the fifth position it will be assumed that the temperature of thermocouple 10c has remained at an unsafe value. Accordingly, amplifier 12 energizes relay 13, and the flip-flop circuit 15 is returned to a state where there is a negative output on conductor 15b which is applied by way of conductors 35 and 65 to AND circuit 45.

The switch 14e in moving to its fifth position energizes relay 31 by completing a circuit for its operating coil by way of the ground connection, coil 31, diode 63, contacts 60a which were left in their closed position during the preceding scan of this point, conductor 61 and switch 14e to the other side of the battery 23. The switch 14d in moving to its fifth position energizes relay 25 and applies a check pulse to multivibrator 28 and by the then closed contacts of relay 31 to multivibrator 38 to produce a negative output signal $S_2$ on line 44 for AND gates 45 and 46. With negative signals on two of its inputs, AND gate 45 is enabled upon the appearance of a negative strobe pulse on line 39a when multivibrator 28 returns to its stable state. With AND gate 45 enabled, an "Old Alarm" signal is produced by the device 42.

There have now been described several operations which may take place and in respect to which distinctive signals will be produced and by means of which it will be known whether magnitudes of the conditions have changed to values above or below their safe magnitudes and whether or not they have persisted at levels beyond their safe magnitudes. Had the magnitude of the condition for thermocouple 10b exceeded its safe value, then the operation would have been quite similar to those already described, and circuits would have been traced by way of the diodes 67 and 68. Similarly, corresponding circuits would have been traced by way of diode 69 in series with the tripping coil 60c.

In the operation of the system, the relays 20, 56 and 60 serve as a memory device for the respective points being scanned. These relays function to remember whether at the time of the last scan an alarm condition did or did not exist. When a relay remains in the state in which its contacts are open, this indicates that the magnitude of the associated condition was on the normal side of the limit at the time that this point was last scanned. Conversely, when a relay remains in the state in which its contacts are closed, this indicates that the magnitude of the condition was on the abnormal side of the limit. The information stored in this memory relative to all points or particular points may be read out by applying a voltage to the associated contact at switch 14e and observing the operation of the relay 31. Such reading of information is without effect upon, and does not in the absence of enabling of gates 17 or 50 alter, the information stored in the memory. The reading of information from the relay memory is accomplished by the relay 31 and the check pulse on conductor 33. If the stored information is "Alarm," the check pulse reads this information by operating multivibrator 38, and if the stored information is "Not Alarm," the check pulse reads this information by not operating multivibrator 38.

Now that the principles of the invention have been explained, it will be understood that many modifications may be made. More particularly, the comparison circuit, including the amplifier 12 and the associated thermocouples 10a–10c and potentiometers 11a–11c, has been illustrated as of the analog type because of the simplicity of the circuit arrangements. It is to be understood that comparison circuits of any of the well known types may be utilized and particularly including the comparison of binary numbers developed by conventional coders which transform analog magnitudes into binary form. In comparing binary numbers, the comparison may be made by comparison of each bit of the two numbers to identify the greater. With such a system, the check pulse on line 27 will be produced only after the time interval required for the comparison. Thus, if a number representing the magnitude of a condition exceeds the number representative of its safe value, an output will be produced on the input conductor 15d of bistable device 15 for operation of that device in the same manner as upon closure of relay 13. Similarly, the relay means may take many different forms as already mentioned. In particular, they may be of the multiple reed type and including permanent magnets for biasing each relay armature to a given position and which by changing the relative degree of energization of a pair of windings produce operation from one switching state to the other. Also, the point selector may be of any type including those which select the points sequentially or in random fashion.

In summary, the amplifier 12 and relay 13 together with the flip-flop circuit 15 comprise a means for comparing quantities representative of the set value and the value of a magnitude of a condition and for producing an output signal on lines or circuits 15a and 15b, one of which will be the complement of the other, depending upon the direction or sign of the difference. This provides information as to the current alarm status, i.e., "Alarm" or "Not Alarm." At the same time, the check pulse developed at the output of the differentiating circuit 26 through the one shot multivibrator 28 and the AND circuits 17 and 50 applies output signals to the relay coils of the relays forming a relay memory means. The contact 14e and its associated source of supply 23 form an addressing means for initially reading out information from the addressed relay of the relay memory means, that is to say, information determined by the switching state of the relay as determined by the information or signal previously applied thereto. The result of this read out is supplied to the operating coil of relay 31 which passes or blocks the check pulse for multivibrator 38 so that this multivibrator will assume a state which depends upon the alarm status at the last scan of the selected point. Subsequent to the reading or transfer of the information stored in the relay memory into the multivibrator 38, the gate enabling pulse on line 29 enables the appropriate gate 17 or 50 to store into the addressed relay of the memory means the existing alarm status which will then remain stored in or by that relay for future use. The current alarm status information from flip-flop 15 and the previous alarm status information from multivibrator 38 are applied to the AND circuits 36, 45 and 46 which may be considered gate means for selectively energizing the appropriate one of the signaling devices 41–43.

What is claimed is:

1. In a system for repeatedly scanning a plurality of quantities each comprising a measured variable and indicating the existing relation between the magnitude of each said quantity and a corresponding set value and the change, if any, between an existing relation and the relation existing during a previous scan of said quantity, the combination comprising means for setting each said set value to correspond with a predetermined magnitude of each said quantity, means for comparing said quantity and said set value for producing an output signal on one of two lines and a complementary signal on the other line depending upon whether or not said quantity is greater than said set value, means for producing a check pulse after said comparison is completed, first gate means responsive to said output signal and to said check pulse for producing an output, addressable relay memory means connected to said first gate means for setting the addressed portion of said relay means in accordance with said output from said first gate means, means for sequentially applying to portions of said relay memory means an address voltage for initially reading the information stored in said addressed portions of said relay memory means during the preceding scan of said memory means and for storing in said addressed portions of said memory means siad existing relation upon energization of said first gate means by said check pulse, means for producing in response to completion of said check pulse a second pulse, and second gate means responsive to (1) said information read from said memory means, (2) to said output signal on said one of said two lines, and (3) to said second pulse following said check pulse for producing a signal indicative of a change in said relation in either direction and the continuation of a preceding relation.

2. The system of claim 1 in which means are provided for producing from said check pulse after a time delay said second pulse which is applied to said second gate means.

3. The system of claim 2 in which said second gate means comprises three AND circuits and three signaling devices respectively controlled thereby respectively indicating a new alarm output, an old alarm output, and a return-to-normal output.

4. The system of claim 1 in which said addressable relay memory means comprises a plurality of bistable relays each having a pair of coils the relative energizations of which produce relay operation from one switching state to a second switching state.

5. The system of claim 4 in which there is provided a source of supply for selectively energizing said coils of said relays each said coil having connected in series therewith a diode, a common conductor for each said relay, each pair of coils associated with each said relay being connected to said common conductor, each said pair of coils having included in circuit therewith a diode, each said common conductor being connected in series with the contacts of its said relay for completion of a circuit thereby, said last-named circuit including a diode and a common source of supply connectible to said common conductor of each said relay, said diodes being connected in their respective circuits with polarities for flow of current through said diodes from said source of supply.

6. The system of claim 5 in which there is provided an additional relay, an addressing switch, and energizing circuits for said last-named relay respectively including said source of supply, said contacts of said relays, and said addressing switch.

7. In a system for continuously scanning a plurality of quantities and for indicating change in magnitudes thereof relative to selected values, the combination of relay storage means comprising a plurality of bistable relays each having a pair of coils which by their relative energization determines the switching states of each said relay, means responsive to change in values of said quantities beyond said predetermined values for respectively operating said relays to switching states representative of "alarm" conditions, means for operating each said relay to its initial switching state upon return of the magnitude of said quantity below its selected value, means including a scanning switch for selectively completing connections to the contacts of said relays, means for distinguishing between the initial actuation of a relay from its first switching state to its second switching state and the continuation of a relay in said second switching state including new alarm and old alarm indicating devices, and an additional indicating device operable upon return of a relay from its second switching state to its first switching state to provide a return-to-normal signal.

8. An information storage device for storage and retrieval of information comprising relays each having a first coil, a second coil and contacts closed by energization of said first coil and opened by energization of said second coil, a unidirectional current flow device connected in series-circuit relation with each coil, common connections to said series-circuits of said coils of each said relay, means for selectively applying to one of said common connections an address signal, means for applying to the other ends of said selected coils signals complementary one to the other for energization of only one of said coils, and an output circuit including said contacts and another unidirectional device in series-circuit relation between an output terminal and said common connection to which said address signal is applied whereby application of said address signal to said common connection produces an output signal determined by the switching states of said relays without change of their states.

9. A system for storage and retrieval of binary coded information comprising one relay for each bit of information to be stored, each said relay comprising first and second coils and a pair of contacts operable from a circuit-opening position to a circuit-closing position by energization of said first coil and operable to their open-circuit position by energization of said second coil, a unidirectional current flow device connected in series-circuit relation with each of said coils, a common connection between each of said series-circuits associated with each relay, a source of an address signal, means for selectively applying said address signal to the common connection of each relay containing information associated with a selected address, an output circuit for each relay including said pair of contacts and another unidirectional current flow device in series-circuit therewith between an output terminal and said common connection for developing an output signal at said terminal upon closure of said contacts and application of said address signal for retrieval of information stored by the relative positions of said relay contacts, and means for selectively applying a signal to said series circuits for energization of those coils only which have simultaneously applied to them said last-named signal and said address signal for operation of said contacts to the one of their two positions corresponding with the bit of information to be stored.

References Cited by the Examiner

UNITED STATES PATENTS

| | | | |
|---|---|---|---|
| 2,815,503 | 12/1957 | Amos | 340—149 |
| 2,854,657 | 9/1958 | Straube | 340—149 |
| 2,967,296 | 1/1961 | Kun Li Chien | 340—172.5 |

MALCOLM A. MORRISON, *Primary Examiner.*